(12) United States Patent
Zhang et al.

(10) Patent No.: US 10,922,134 B2
(45) Date of Patent: Feb. 16, 2021

(54) METHOD, DEVICE AND COMPUTER PROGRAM PRODUCT FOR PROCESSING DATA

(71) Applicant: EMC IP Holding Company LLC, Hopkinton, MA (US)

(72) Inventors: Ming Zhang, Beijing (CN); Zan Liu, Beijing (CN); Shuo Lv, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 64 days.

(21) Appl. No.: 16/358,181

(22) Filed: Mar. 19, 2019

(65) Prior Publication Data

US 2019/0332426 A1 Oct. 31, 2019

(30) Foreign Application Priority Data

Apr. 28, 2018 (CN) .......................... 201810401231.1

(51) Int. Cl.
*G06F 9/48* (2006.01)
*G06F 9/50* (2006.01)
*G06F 12/0802* (2016.01)
*G06F 16/903* (2019.01)
*G06F 16/907* (2019.01)

(52) U.S. Cl.
CPC .......... *G06F 9/4881* (2013.01); *G06F 9/5038* (2013.01); *G06F 12/0802* (2013.01); *G06F 16/907* (2019.01); *G06F 16/90335* (2019.01)

(58) Field of Classification Search
CPC .............................. G06F 9/4881; G06F 16/907

USPC ..................................................... 718/1–108
See application file for complete search history.

(56) References Cited

U.S. PATENT DOCUMENTS

| 10,496,333 | B2 | 12/2019 | Yang et al. |
| 10,503,437 | B2 | 12/2019 | Martin et al. |
| 10,592,813 | B1 | 3/2020 | Ciarlini et al. |
| 2012/0210071 | A1* | 8/2012 | Black ................ G06F 12/1036 711/130 |
| 2013/0346994 | A1* | 12/2013 | Chen ..................... G06F 9/5044 718/104 |

(Continued)

OTHER PUBLICATIONS

Zhang, Qi, et al. "SIFT implementation and optimization for multi-core systems." 2008 IEEE International Symposium on Parallel and Distributed Processing. IEEE, 2008.pp. 1-8 (Year: 2008).*

(Continued)

*Primary Examiner* — Satish Rampuria
(74) *Attorney, Agent, or Firm* — BainwoodHuang

(57) ABSTRACT

Techniques process data. The techniques involve determining priority of a plurality of cores of a processor based on metadata stored in a plurality of queues associated with the plurality cores, respectively, the metadata being related to data blocks to be processed that are associated with the respective cores, and the metadata in each of the queues being sorted by arrival times of the respective data blocks to be processed. The techniques further involve storing core identifiers of the plurality of cores into a cache by an order of the priorities. By means of at least some of the above techniques, quick insertion of metadata can be realized through multiple queues and the efficiency of determining data blocks to be processed is improved based on sorting of the cores.

20 Claims, 8 Drawing Sheets

(56) References Cited

U.S. PATENT DOCUMENTS

| | | | |
|---|---|---|---|
| 2015/0150019 A1* | 5/2015 | Sheaffer | G06F 9/5044 |
| | | | 718/104 |
| 2015/0169382 A1* | 6/2015 | Anderson | G06F 9/5094 |
| | | | 718/104 |
| 2016/0378545 A1* | 12/2016 | Ho | G06F 9/46 |
| | | | 718/107 |
| 2020/0133870 A1 | 4/2020 | Zhang et al. | |

OTHER PUBLICATIONS

Pesterev, Aleksey, et al. "Improving network connection locality on multicore systems." Proceedings of the 7th ACM european conference on Computer Systems. 2012.pp. 337-350 (Year: 2012).*

Liao, Guangdeng, et al. "Software techniques to improve virtualized I/O performance on multi-core systems." Proceedings of the 4th ACM/IEEE Symposium on Architectures for Networking and Communications Systems. 2008.pp. 161-170 (Year: 2008).*

Gummaraju, Jayanth, et al. "Streamware: programming general-purpose multicore processors using streams." ACM SIGARCH Computer Architecture News 36.1 (2008): pp. 297-307. (Year: 2008).*

Dolbeau, Romain, Stéphane Bihan, and François Bodin. "HMPP: A hybrid multi-core parallel programming environment." Workshop on general purpose processing on graphics processing units (GPGPU 2007). vol. 28. 2007.pp. 1-5 (Year: 2007).*

Chen, Jian, and Lizy K. John. "Efficient program scheduling for heterogeneous multi-core processors." 2009 46th ACM/IEEE Design Automation Conference. IEEE, 2009.pp. 927-930 (Year: 2009).*

* cited by examiner

METHOD, DEVICE AND COMPUTER PROGRAM PRODUCT FOR PROCESSING DATA

CROSS-REFERENCE TO RELATED APPLICATIONS

This application claims priority to Chinese Patent Application No. CN201810401231.1, on file at the China National Intellectual Property Administration (CNIPA), having a filing date of Apr. 28, 2018, and having "METHOD, DEVICE AND COMPUTER PROGRAM PRODUCT FOR PROCESSING DATA" as a title, the contents and teachings of which are herein incorporated by reference in their entirety.

FIELD

Embodiments of the present disclosure generally relate to data processing, and more specifically, to a method, device and computer program product for processing data in a multicore system.

BACKGROUND

When a processor processes data, a first-in-first-out (FIFO) list is generally used to sort data to be processed. Therefore, the received data are all inserted into the FIFO list according to time order, thus realizing first-in-first-out processing of data, that is, the first incoming task is processed first. However, with the improvement of processing technology of the processor, the processor now typically includes multiple cores. When data insertion for a single FIFO queue is accomplished through multiple cores, to ensure data security of the FIFO queue, some resources might be locked when a certain core inserts data into the FIFO list to prevent the operation of other cores, which might result in the problem that cores contend with each other for limited resources, thereby reducing the efficiency of data insertion.

With the development of multicore technology, in order to reduce the problem generated when there is only one FIFO queue, each core is generally configured with a corresponding FIFO list to realize insertion and processing of the data to be processed. Each core uses its own FIFO list to manage data processed by the core, improving the efficiency of parallel operation. However, since each core has a thread to execute data of its own FIFO queue, more threads are used for processing data so that more internal hardware resources of the processor are used for this processing, resulting in a decline in the utilization rate of hardware resources.

SUMMARY

Embodiments of the present disclosure provide a method, device and computer program product for processing data.

According to a first aspect of the present disclosure, there is provided a method of processing data. The method includes determining priority of a plurality of cores of a processor based on metadata stored in a plurality of queues associated with the plurality of cores, respectively, the metadata being related to data blocks to be processed that are associated with the respective cores, and the metadata in each of the queues being sorted by arrival times of the respective data blocks to be processed. The method further includes storing core identifiers of the plurality of cores into a cache by an order of the priorities.

According to a second aspect of the present disclosure, there is provided an electronic device for processing data. The electronic device includes a processor and a memory having computer program instructions stored thereon, the processor executing the computer program instructions in the memory to control the electronic device to perform acts including: determining priorities of a plurality of cores of a processor based on metadata stored in a plurality of queues associated with a plurality of cores, respectively, the metadata being related to data blocks to be processed that are associated with the respective cores, and the metadata in each of the queues being sorted by arrival time of the respective data blocks to be processed. The acts further include storing core identifiers of the plurality of cores into a cache by an order of the priorities.

According to a third aspect of the present disclosure, there is provided a computer program product being tangibly stored on a non-volatile computer-readable medium and including computer-executable instructions which, when executed, cause a machine to implement steps of the method according to the first aspect of the present disclosure.

In accordance with certain embodiments, the processor resides within a data storage system that performs host input/output (I/O) operations on behalf of a set of host computers. Additionally, determining priorities of the plurality of cores of the processor based on the metadata stored in the plurality of queues associated with the plurality of cores includes ascertaining the priorities of the plurality of cores of the processor residing within the data storage system while the data storage system performs host I/O operations on behalf of the set of host computers. Furthermore, storing the core identifiers of the plurality of cores into the cache by the order of the priorities includes saving (or writing) the core identifiers of the plurality of cores into the cache while the data storage system performs the host I/O operations on behalf of the set of host computers.

BRIEF DESCRIPTION OF THE DRAWINGS

Through more detailed description of example embodiments of the present disclosure with reference to the accompanying drawings, the above and other objectives, features, and advantages of example embodiments of the present disclosure will become more apparent. In example embodiments of the present disclosure, the same reference symbols usually refer to the same components.

In each drawing, the same or corresponding signs refer to the same or corresponding elements.

DETAILED DESCRIPTION OF EMBODIMENTS

Figure 1:
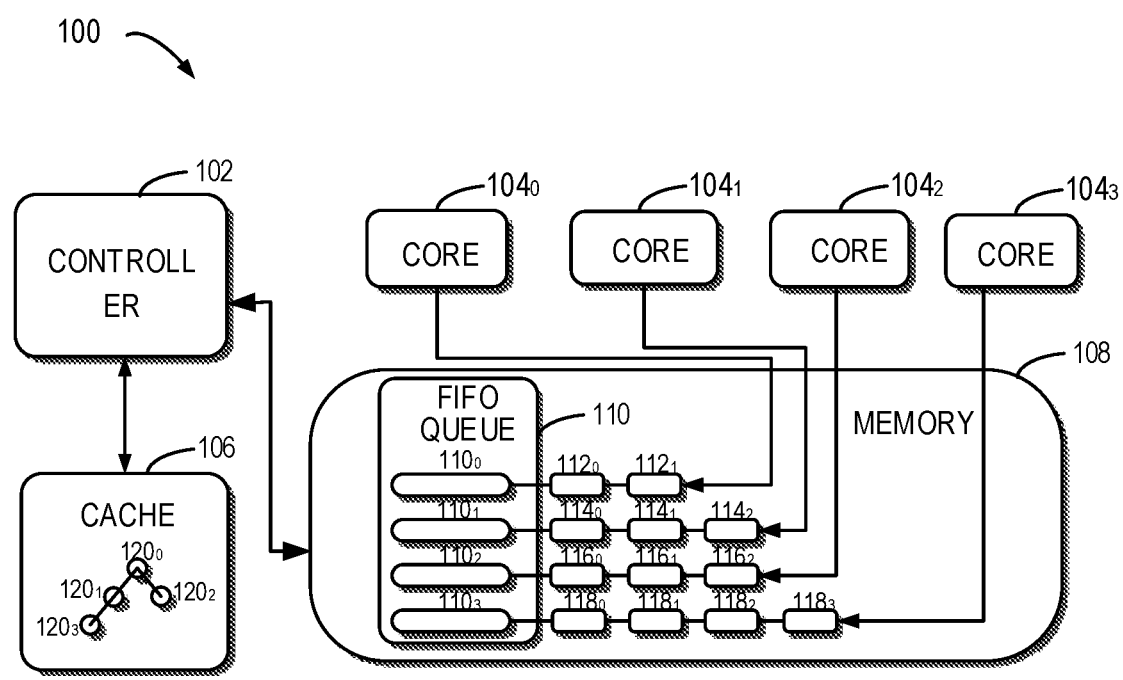
FIG. 1 is a schematic diagram illustrating an example environment 100 in which a device and/or method may be implemented in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in the following in greater detail with reference to the drawings. Although some embodiments of the present disclosure are displayed in the drawings, it is to be understood that the present disclosure can be implemented in various manners, not limited to the embodiments illustrated herein. On the contrary, these embodiments are provided to make the present disclosure more thorough and complete. It is to be understood that the drawings and embodiments of the present disclosure are only for the purpose of illustration, rather than to limit the scope of protection of the present disclosure.

In the depiction of embodiments of the present disclosure, the term "includes" and its variants are to be considered as open-ended terms that mean "includes, but is not limited to." The term "based on" is to be understood as "based at least in part on." The term "an embodiment" or "the embodiment" is to be read as "at least an embodiment." Terms "first," "second" and others can denote different or identical objects. The following text may also contain other explicit and implicit definitions.

Principles of the present disclosure will be described with reference to several example embodiments illustrated in the drawings. Although preferred embodiments of the present disclosure are displayed in the drawings, it is to be understood that these embodiments are only provided to enable those skilled in the art to better understand and further implement the present disclosure, rather than to limit the scope of the present disclosure in any manner.

When an FIFO queue is used in a multicore processor to process data, as there is only one processing thread, fewer operations will be generated during the thread switching. However, the problem that multiple cores contend for resources will be caused, such as the FIFO queue is needed to be locked when one core is operating it to protect the security of the FIFO queue. When an FIFO queue is created for each of the multiple cores and the corresponding thread for processing the data is configured, the insertion of data into the FIFO queue will be accelerated. However, when a plurality of threads for processing data in the FIFO queue are executed, too many operations will be caused by thread switching, thereby reducing the efficiency of the processor.

To solve the above problem, in the present disclosure, when data are operated, an insertion thread is configured on each of the multiple cores to form an FIFO queue for each of the multiple cores. By means of configuring an FIFO queue for each core, the insertion thread of each core may insert metadata of the data block to be processed directly into its own queue without the need for contention as with a single FIFO queue, which improves the insertion efficiency. Meanwhile, when data blocks are processed, one thread is used to read metadata of each data block sequentially from a plurality of FIFO queues to process data blocks so as to avoid the adverse effect brought by thread switching when multiple threads are used. Thus, embodiments of the present disclosure achieve quick insertion of tasks and the processing similar to a single FIFO queue.

FIG. 1 is a schematic diagram illustrating an example environment 100 in which a device and/or method may be implemented in accordance with embodiments of the present disclosure. The example environment 100 has a controller 102, cores 104$_0$-104$_3$, a cache 106 and a memory 108.

Cores 104$_0$-104$_3$ run the insertion threads when performing data processing. In an embodiment, each core runs an insertion thread. The insertion thread inserts the metadata of the data block to be processed allocated to it into the queue corresponding to the core that the thread is located in the memory 108.

The metadata include time information. In an example, the arrival time of the data block to be processed is set as time information in the metadata. In another embodiment, time when the metadata are inserted into the queue is set as time information in the metadata. In still another embodiment, time when the insertion thread receives the metadata of the data block is used as time information of the metadata. In the present disclosure, the above number of cores is used an example, rather than for limiting the present disclosure. Any number of cores may be configured as needed.

The cache 106 stores information about each core. In the cache 106, the core identifier is stored (e.g., maintained) based on the priority corresponding to the core. The priority of the core is determined (e.g., ascertained) based on the weight of the core which is obtained from the first metadata in the FIFO queue corresponding to the core. Alternatively or additionally, the weight is obtained from time information of the metadata.

As an example, in the cache 106, the identification information 120$_0$-120$_3$ includes core identifier and weight information thereof and is stored in the form of a heap structure. Alternatively or additionally, the heap structure is a binary heap structure.

The memory 108 is used for storing FIFO queues 110$_0$-110$_3$ corresponding to individual cores. The FIFO queues for different cores are stored (or arranged) based on time order. The metadata in an FIFO queue are processed based on first-in-first-out principle. The metadata 112-118 are metadata from the corresponding core inserted into the FIFO queue.

The controller 102 is used for selecting the metadata corresponding the core identifier having the highest priority and then allocating the data block corresponding to the metadata to the core for processing. When a sequential queue of core identifiers is created in the cache 106, the controller reads first metadata of each FIFO queue corresponding to the core of the allocated metadata from the memory 108 and determines (or ascertains) the weight of each core identifier from the first metadata of each queue. Then, the core identifiers are sorted according to their weights and then the sorted core identifiers are stored in the cache 106 to determine that the metadata corresponding to which core identifier should be processed directly from the cache 106 when data blocks performed.

When reading the first metadata from the queue corresponding to the core identifier having the highest priority, the controller 102 further obtains the weight of the metadata next to the first metadata from the queue and stores (e.g., writes or saves) the weight used as the weight of the core identifier again into the cache 106. Then, the identifiers stored in the cache 106 are processed again to determine the priority of the core identifier.

The example environment 100 for the device and/or method according to embodiments of the present disclosure is described in the above FIG. 1. The method 200 for processing data in accordance with embodiments of the present disclosure will be described below with reference to FIG. 2.

When the processor receives a processing task, it will allocate metadata of different data blocks into different cores and the insertion thread on each core will insert the metadata blocks allocated to it into the FIFO queue corresponding to the core. Each core having an insertion thread has a corresponding FIFO queue.

At block 202, the priorities of a plurality of cores of a processor are determined based on metadata stored in a plurality of queues associated with the plurality of cores, respectively. The metadata relate to data blocks to be processed associated with the respective cores and the metadata in each queue are sorted by arrival time of the respective data blocks to be processed.

One piece of metadata stored in each queue corresponds to a data block to be processed. The metadata include various information required for processing the data block. In an example, the metadata include storage location of the data block corresponding to the metadata, arrival time of the data block and so on. Alternatively or additionally, the metadata further include the time when the metadata are inserted into the queue.

In the queue of the metadata corresponding to each core, the metadata are sorted in time sequence in the queue. In order to determine which of the multiple queues has the earliest incoming data block, embodiments of the present disclosure take weight of the first metadata in the queue as the weight of the core, that is, as the priority of the core identification. In an example, the weight of the metadata is associated with the arrival time of the data block. In another example, the weight of the metadata is associated with the time when the metadata of the data block are inserted into the queue. Therefore, it can be determined which queue has the metadata of the data block to be processed first by determining the priority order of multiple cores. How to determine the priority of multiple cores will be described below with reference to FIG. 3.

After obtaining the plurality of core identifiers and the corresponding priority thereof, the core identifiers are sorted. At block 204, the core identifiers of multiple cores are stored in the cache 106 by the order of priorities. In an example, the core identifiers and weights thereof may be stored using a binary heap structure. Alternatively or additionally, the core identifiers and the weights thereof are stored in an array. In another example, the core identifiers and the weights thereof are stored in the queue.

Figure 2:
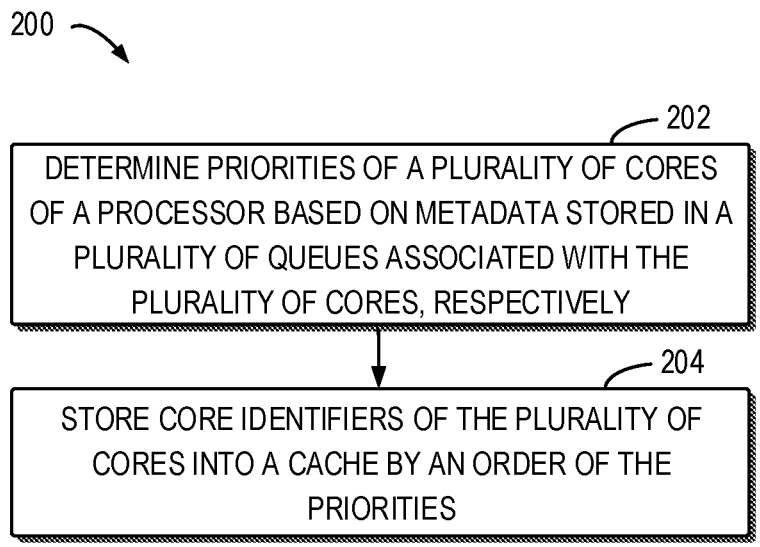
FIG. 2 is a flowchart illustrating a method 200 for processing data in accordance with embodiments of the present disclosure.
Figure 3:
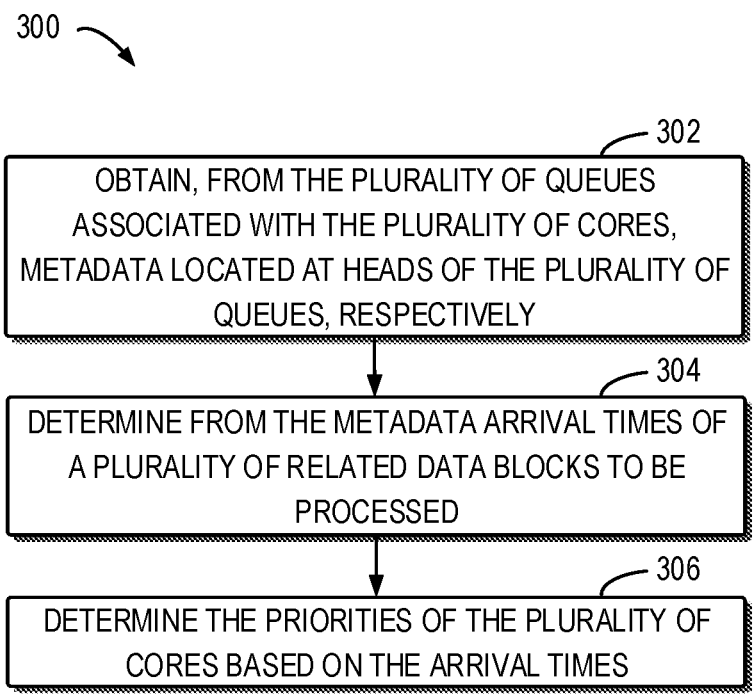
FIG. 3 is a flowchart illustrating a method 300 for determining priorities of cores in accordance with embodiments of the present disclosure.

The flowchart of method 200 for processing data has been described in the above FIG. 2. Reference will be made to FIG. 3 below to depict a flowchart of a method 300 for determining the priority of multiple cores.

To be able to determine the metadata at the head of which queue among queues associated with the core have the highest weight, namely, can be processed first, the weight of the metadata at the head of the queue is set as the priority of the corresponding core in the present disclosure. Therefore, the metadata of the data blocks to be processed may be determined through the priority order of the cores.

At block 302, metadata located at the heads of the plurality queues may be obtained from the plurality of queues associated with the plurality of cores, respectively. Since each queue for each core is stored based on time order, the metadata at each queue head are the earliest incoming metadata in the queue.

At block 304, the arrival time of the plurality of related data blocks to be processed is determined from the metadata. Each metadata corresponds to a data block. Therefore, the arrival time of data blocks to be processed may be stored in the metadata. When the metadata are obtained, the arrival time of a plurality of data blocks to be processed may be obtained.

At block 306, the priorities of a plurality of cores are determined based on the arrival time. After the arrival time of each piece of metadata is obtained, the weight of the metadata may be determined based on the arrival time. Then, the weight of the metadata at the queue head is used as the weight of the core corresponding to the queue. Then, the priority of the core is determined based on the weight.

By means of determining the priority of the core only using time information of the metadata at the head of the queue, the multiple metadata corresponding to the number of the cores are compared or sorted so as to determine the earliest incoming data block without the need to compare the weights of all the metadata, reducing the time for determining the earliest data block.

Figure 4:
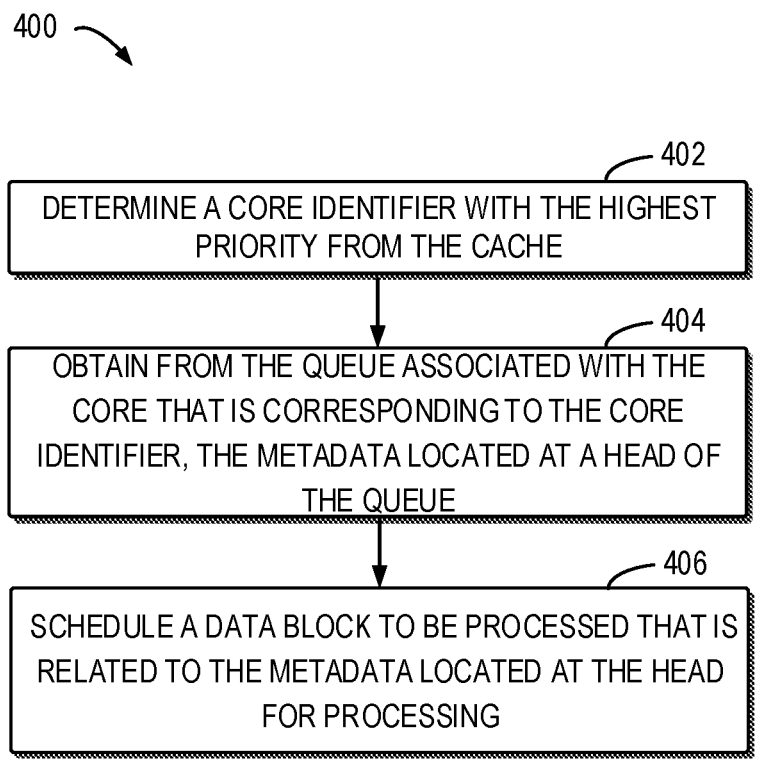
FIG. 4 is a flowchart illustrating a method 400 for processing data in accordance with embodiments of the present disclosure.

FIG. 3 depicts a process for determining priority of multiple cores. A method for processing data blocks using the sorted priority will be described below with reference to FIG. 4.

When it is necessary to schedule and process data blocks, at block 402, the core identifier with the highest priority is determined from the cache 106. As the core identifiers stored based on the priority of the identifiers are stored in the cache 106, the controller 102 may read the core identifier with the highest priority directly from the cache 106. In an example, the core identifiers and priority thereof are stored using an array. As the address of the data is fixed, it is possible to read the core identifier with the highest priority directly from the first position of the array, namely, a fixed position. In another example, the identifier and its priority may also be stored using a chain table.

At block 404, the metadata located at the head of the queue are obtained from the queue associated with the core that is corresponding to the core identifier. After the core identifier having the highest priority is obtained from the cache 106, the FIFO queue corresponding to the core identifier is looked up through the core identifier. After the corresponding FIFO queue is found, the metadata of the head of the FIFO queue are obtained from the FIFO queue. The metadata are namely metadata of the data block to be processed.

After the metadata are determined, at block 406, the data block to be processed that is related to the metadata at the head are scheduled for processing. As metadata correspond to the data block to be processed, when the thread inside the controller 102 processes metadata, data block corresponding to the metadata will be transmitted to the corresponding core for processing.

By means of obtaining the core identifier from the cache 106 to determine the metadata of the data block to be processed, the metadata with the smallest weight can be located quickly without the need to compare the metadata in each queue, and the metadata having the smallest weight can be determined directly, shortening the time for determining the metadata with the smallest weight and improving the efficiency for processing data blocks.

Figure 5:
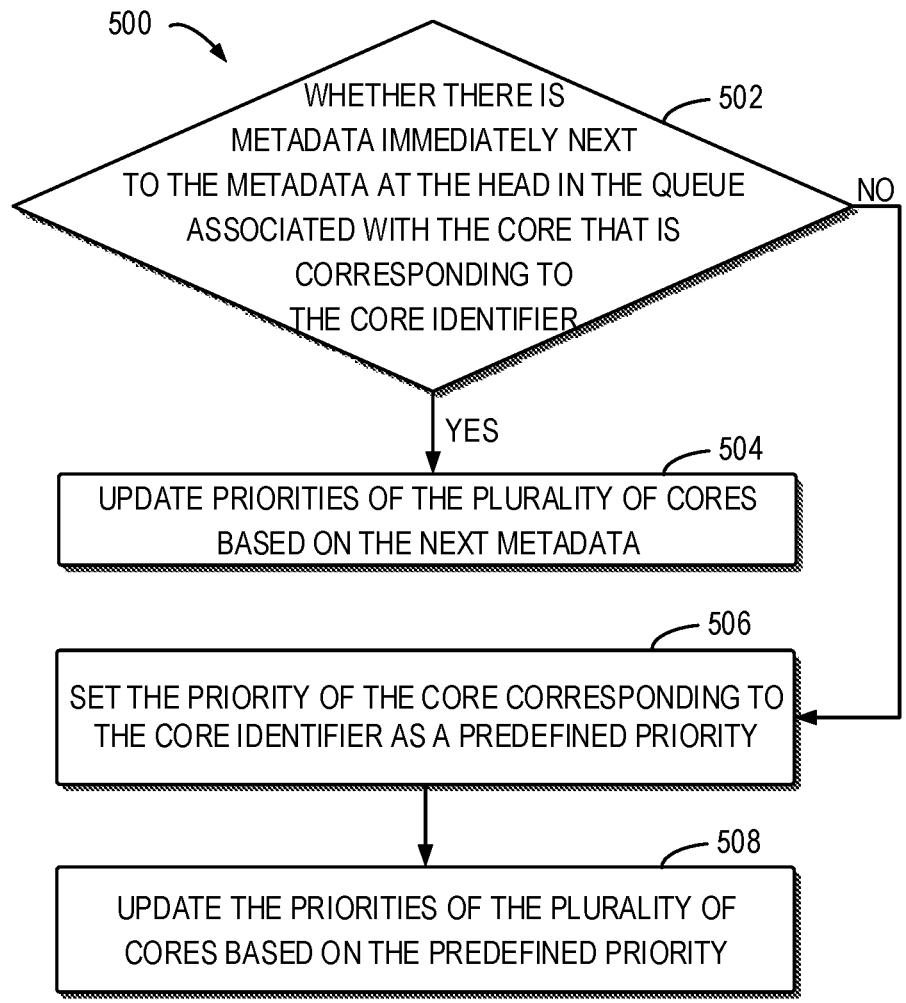
FIG. 5 is a flowchart illustrating a method 500 for updating priorities of cores in accordance with embodiments of the present disclosure.

The process for scheduling and processing data blocks through core identifiers has been described above with reference to FIG. 4. The process of how to update the priority of multiple cores after the identifier having the highest priority obtains metadata will be described below with reference to FIG. 5.

After the metadata of data blocks to be processed are obtained from the queue corresponding the core identifier with the highest priority, it is further necessary to determine whether there is a metadata immediately next to the metadata at the head of the queue in the queue associated with the core corresponding to the core identifier. As the data block corresponding to the core identifier has been processed, the priority of the core should be re-determined. Since the priority of the core corresponds to the metadata in the head of the FIFO queue, information of the metadata next to the metadata at the queue head should be obtained after the metadata at the queue head are processed.

Hence, at block 502, it is necessary to determine, in the queue associated with the core that is corresponding to the core identifier, whether there is a metadata immediately next to the metadata at the head of the queue. If it is determined that there is the next metadata, at block 504, the priority of multiple cores is updated based on the next metadata.

The updating process of the priority of multiple cores will be described below with reference to FIGS. 6A-6D when there is the next metadata.

FIG. 6 is a schematic diagram 600 illustrating an example for updating the priority of cores in accordance with embodiments of the present disclosure, where a binary heap structure is used to store core identifiers and the priority of cores corresponds to the weights thereof. In FIG. 6, seven cores are taken as an example, which is only for illustrating the technical solution of the present disclosure, rather than for limiting the present disclosure.

Figure 6A:
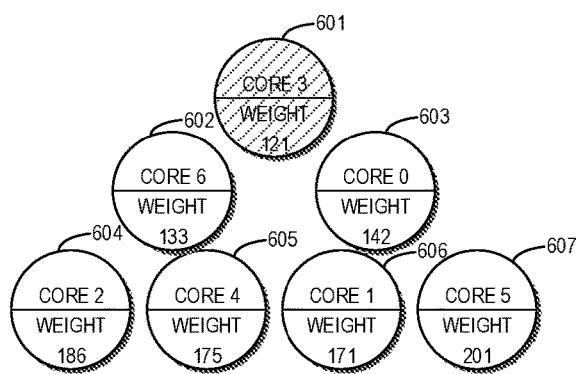
FIGS. 6A-6D are schematic diagrams 600 illustrating an example for updating priority of cores in accordance with embodiments of the present disclosure.
Figure 6B:
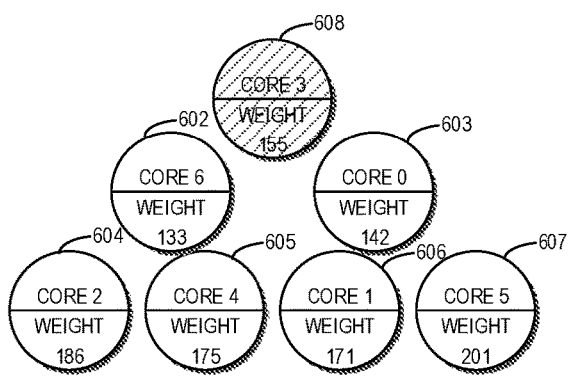
Figure 6C:
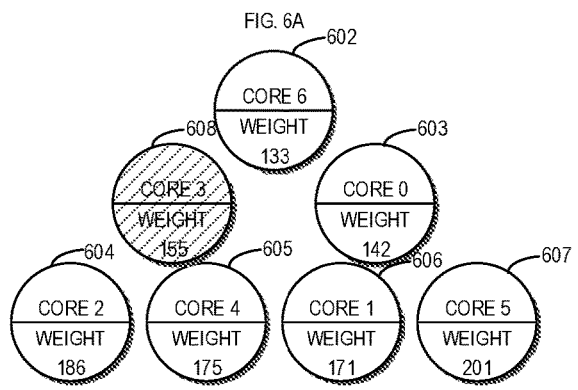
Figure 6D:
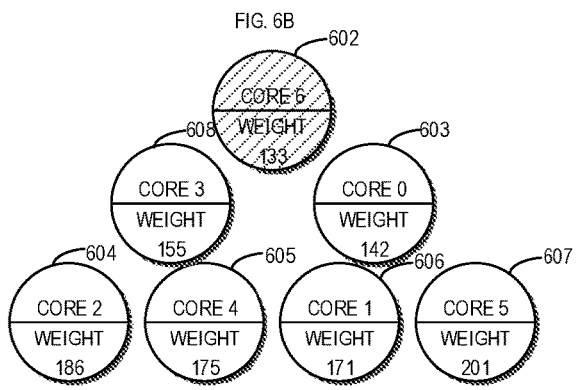
Figure 7A:
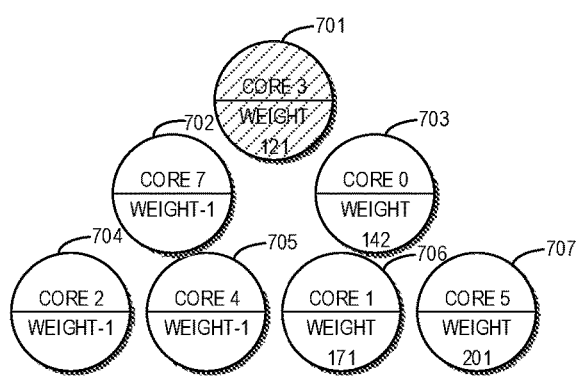
FIGS. 7A-7D are schematic diagrams 700 illustrating another example for updating priority of cores in accordance with embodiments of the present disclosure.
Figure 7B:
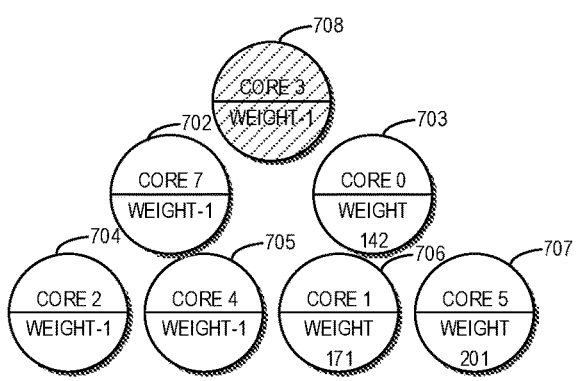
Figure 7C:
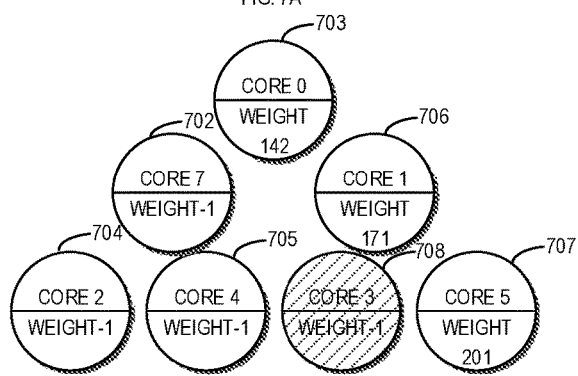
Figure 7D:
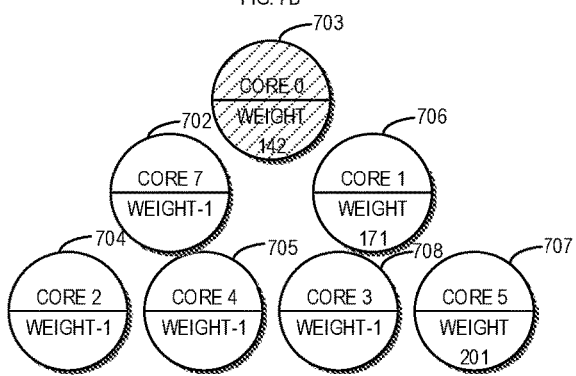

As shown in FIG. 6(A), since CPU 3 has the smallest weight at node 601, the metadata of data blocks to be processed are selected based on the identifier of the CPU 3. When there is the next metadata after the metadata at the queue head in the queue corresponding to CPU 3, the weight of the next metadata is taken as the weight of the core 3. As shown in (B) part, the weight of the core 3 is set as 155, forming a new node 608. Therefore, the weight of the core 3 will be compared with the weight of the core 6 in the node 602, which has a smaller weight between two nodes 602 and 603. As the weight of core 6 is 133, its weight is smaller than that of core 3. Therefore, the node 608 having the new weight value and node 602 are exchanged. As illustrated in (C) part, the weight of core 3 is compared with two nodes 604 and 605 in the next layer connected thereto. Since the core 2 of node 604 has a smaller weight between two nodes at the lower layer, its weight is 186, greater than that of core 3 in node 608. Therefore, node 608 will no longer be exchanged with 604. Then, the priority updating of the core identifier is completed. The core 6 having the smallest weight becomes the node having the highest priority. The data block to be processed next time corresponds to core 6, as shown in (D) part.

The above describes processing of updating priority when there is the next metadata. Now, returning to FIG. 5, the following operation continues to be described. When there is no the next metadata, at block 506, the priority of the core corresponding to the core identifier is set as a predefined priority. Since there is no the next metadata in the queue, it shows that there is no the metadata of the data block to be processed in the queue. Therefore, it is possible to predefine a greater weight value for the core identifier. The predefined weight is used as the predefined priority. The weight value may be set to be greater. Alternatively or additionally, the weight of the core identifier is configured as −1.

At block 508, the priorities of the plurality of cores are updated based on the predefined priority. The process of updating priority will be described in greater detail below with reference to FIG. 7.

FIG. 7 depicts a process for updating priorities of multiple cores when there is no next metadata. As described in FIG. 6, a binary heap structure is used to store data and the priority of the core corresponds to the weight thereof. In FIG. 7, seven cores are used as an example, which is only for illustrating the technical solution of the present disclosure, rather than for limiting the present disclosure.

As illustrated in (A) part in FIG. 7, since the CPU 3 of node 701 has the smallest weight, the metadata of the data block to be processed are determined based on the identifier of CPU 3. When there is no metadata next to the metadata at the queue head in the queue corresponding to CPU 3, the weight of the core 3 is set as a greater value. As illustrated in (B) part, the weight of core 3 is configured as −1, which indicates that the weight of core 3 is very big. Therefore, the weight of the node 708 with a new weight value will be compared with core 0 of the node 703, which has a smaller weight between two node 702 and 703. Since the weight of the core 0 is 142, which is smaller than that of core 3, node 708 and node 703 are exchanged. As shown in (C) part, the weight of node 708 is compared with two nodes 706 and 707 of the next layer connected thereto. There are two nodes 706 and 707 in the next layer, in which the weight of core 1 in node 706 is 171, which is greater than that of core 3 in the node 707. The node 708 and node 706 are exchanged. Because core 3 does not have any nodes below, the updating of priority of the core identifier is completed. The core 0 having the smallest weight becomes the node having the highest priority. The metadata of the data block to be processed next time then correspond to core 0, as shown in (D) part.

The priority of cores is sorted using a heap structure, thereby accelerating the sorting of core priority. In addition, by means of configuring the weight of the next metadata as the priority of the corresponding core, the priority of the core can be updated at a greater speed so that the queue that the metadata to be processed next time are located in can be determined while the data block to be processed is performed, thereby speeding up data processing.

Figure 8:
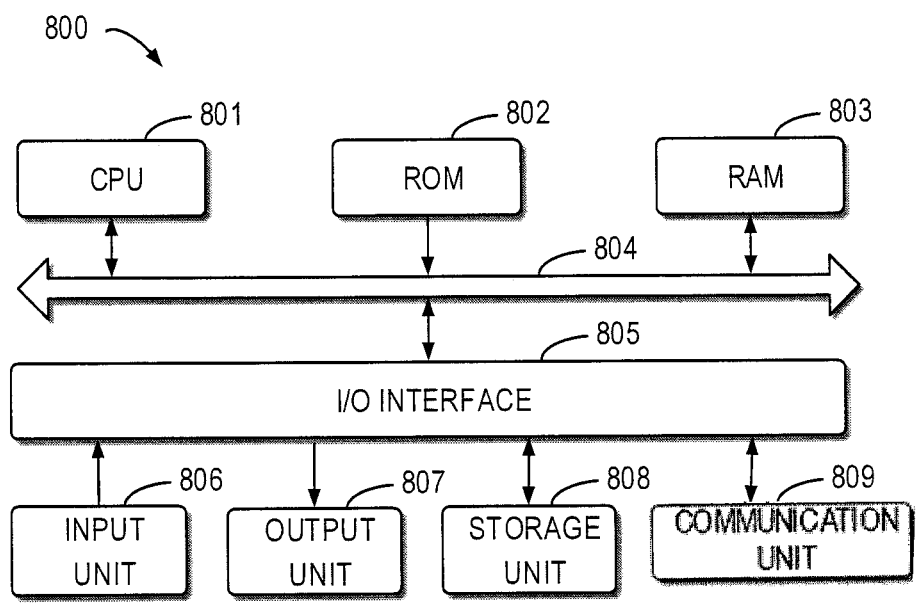
FIG. 8 is a schematic block diagram illustrating an example device 800 suitable to implement embodiments of the present disclosure.

FIG. 8 is a schematic block diagram illustrating an example device 800 such as that of data storage equipment that may be used to implement embodiments of the present disclosure. For example, any of 101 and 104$_0$-104$_4$ shown in FIG. 1 may be implemented by device 800. As illustrated, the device 800 includes a central processing unit (CPU) 801 which may perform various appropriate actions and processing according to the computer program instructions stored in a read-only memory (ROM) 802 or the computer program instructions loaded from a storage unit 808 into a random access memory (RAM) 803. The RAM 803 also stores all kinds of programs and data required by operating the storage device 800. CPU 801, ROM 802 and RAM 803 are connected to each other via a bus 804, to which an input/output (I/O) interface 805 is also connected.

A plurality of components in the device 800 are connected to the I/O interface 805, including: an input unit 806, such as keyboard, mouse and the like; an output unit 807, such as various types of display, loudspeakers and the like; a storage unit 808, such as magnetic disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

Each procedure and processing described above, such as method 200, 300, 400 and 500, may be performed by a processing unit 801. As an example, in some embodiments, 200, 300, 400 or 500 may be implemented as computer software programs, which are tangibly included in a machine-readable medium, such as storage unit 808. In some embodiments, the computer program may be partially or completely loaded and/or installed to the device 800 via ROM 802 and/or the communication unit 809. When the computer program is loaded to RAM 803 and executed by CPU 801, one or more acts of the above described method 200, 300, 400 or 500 are performed.

The present disclosure may be a method, an apparatus, a system and/or a computer program product. The computer program product can include a computer-readable storage medium having computer-readable program instructions stored thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via network, such as Internet, local area network, wide area network and/or wireless network. The network can include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storing into the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can include a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of processing data, comprising:
   determining priorities of a plurality of cores of a processor based on metadata stored in a plurality of queues associated with the plurality of cores, respectively, the metadata being related to data blocks to be processed that are associated with the respective cores, and the metadata in each of the queues being sorted by arrival times of the respective data blocks to be processed;
   storing core identifiers of the plurality of cores into a cache by an order of the priorities;
   determining a core identifier with the highest priority from the cache;
   setting the priority of the core corresponding to the core identifier as a predefined priority; and
   updating the priorities of the plurality of cores based on the predefined priority;
   wherein the processor resides within a data storage system that performs host input/output (I/O) operations on a behalf of a set of host computers; and
   wherein storing the core identifiers of the plurality of cores into the cache includes:
       writing the core identifiers of the plurality of cores into the cache while the data storage system performs the host I/O operations on behalf of the set of host computers.

2. The method according to claim 1, wherein determining the priorities of the plurality of cores comprises:
   obtaining, from the plurality of queues associated with the plurality of cores, metadata located at heads of the plurality of queues, respectively;
   determining, from the metadata, arrival times of a plurality of related data blocks to be processed; and
   determining the priorities of the plurality of cores based on the arrival times.

3. The method according to claim 1, wherein writing the core identifiers of the plurality of cores into the cache comprises:
   storing, by the order of the priorities, the core identifiers of the plurality of cores in the cache in form of an array or a chain table.

4. The method according to claim 1, further comprising:
   obtaining, from the queue associated with the core that is corresponding to the core identifier, the metadata located at a head of the queue; and
   scheduling a data block to be processed that is related to the metadata located at the head for processing.

5. The method according to claim 4, further comprising:
   determining, in the queue associated with the core that is corresponding to the core identifier, whether there is metadata immediately next to the metadata at the head; and
   in response to determining that there is the next metadata, updating priorities of the plurality of cores based on the next metadata.

6. The method according to claim 5, wherein setting the priority of the core corresponding to the core identifier is performed in response to determining that there is no next metadata.

7. The method according to claim 6, further comprising:
   sorting the updated priorities of the plurality of cores using a heap structure; and
   storing the core identifiers of the plurality of cores into the cache based on the sorted priorities.

8. An electronic device for processing data, comprising:
   a processor; and
   a memory having computer program instructions stored thereon, the processor executing the computer program instructions in the memory to control the electronic device to perform acts comprising:
       determining priorities of a plurality of cores of a processor based on metadata stored in a plurality of queues associated with a plurality of cores, respectively, the metadata being related to data blocks to be processed that are associated with the respective cores, and the metadata in each of the queues being sorted by arrival times of the respective data blocks to be processed;
       storing core identifiers of the plurality of cores into a cache by an order of the priorities;
       determining a core identifier with the highest priority from the cache;
       setting the priority of the core corresponding to the core identifier as a predefined priority; and
       updating the priorities of the plurality of cores based on the predefined priority;
   wherein the electronic device resides within a data storage system that performs host input/output (I/O) operations on a behalf of a set of host computers; and
   wherein storing the core identifiers of the plurality of cores into the cache includes:
       writing the core identifiers of the plurality of cores into the cache while the data storage system performs the host I/O operations on behalf of the set of host computers.

9. The electronic device according to claim 8, wherein determining the priorities of the plurality of cores comprises:
   obtaining, from the plurality of queues associated with the plurality of cores, metadata located at heads of the plurality of queues, respectively;

determining from the metadata arrival times of a plurality of related data blocks to be processed; and
determining the priorities of the plurality of cores based on the arrival times.

10. The electronic device according to claim 8, wherein writing the core identifiers of the plurality of cores into the cache comprises:
storing, by the order of the priorities, the core identifiers of the plurality of cores in the cache in form of an array or a chain table.

11. The electronic device according to claim 8, further comprising:
obtaining, from the queue associated with the core that is corresponding to the core identifier, the metadata located at a head of the queue; and
scheduling the data block to be processed that is related to the metadata located at the head for processing.

12. The electronic device according to claim 11, further comprising:
determining, in the queue associated with the core that is corresponding to the core identifier, whether there is metadata immediately next to the metadata at the head; and
in response to determining that there is the next metadata, updating priorities of the plurality of cores based on the next metadata.

13. The electronic device according to claim 12, wherein setting the priority of the core corresponding to the core identifier is performed in response to determining that there is no next metadata.

14. The electronic device according to claim 13, further comprising:
sorting the updated priorities of the plurality of cores using a heap structure; and
storing the core identifiers of the plurality of cores into the cache based on the sorted priorities.

15. A computer program product having a non-transitory computer readable medium which stores a set of instructions for processing data; the set of instructions, when carried out by computerized circuitry, causing the computerized circuitry to perform a method of:
determining priorities of a plurality of cores of a processor based on metadata stored in a plurality of queues associated with the plurality of cores, respectively, the metadata being related to data blocks to be processed that are associated with the respective cores, and the metadata in each of the queues being sorted by arrival times of the respective data blocks to be processed;
storing core identifiers of the plurality of cores into a cache by an order of the priorities;
determining a core identifier with the highest priority from the cache;
setting the priority of the core corresponding to the core identifier as a predefined priority; and
updating the priorities of the plurality of cores based on the predefined priority;
wherein the processor resides within a data storage system that performs host input/output (I/O) operations on a behalf of a set of host computers; and
wherein storing the core identifiers of the plurality of cores into the cache includes:
writing the core identifiers of the plurality of cores into the cache while the data storage system performs the host I/O operations on behalf of the set of host computers.

16. The computer program product of claim 15 wherein determining priorities of the plurality of cores of the processor based on the metadata stored in the plurality of queues associated with the plurality of cores includes:
ascertaining the priorities of the plurality of cores of the processor residing within the data storage system while the data storage system performs host I/O operations on behalf of the set of host computers; and
wherein writing the core identifiers of the plurality of cores into the cache by the order of the priorities includes:
saving the core identifiers of the plurality of cores into the cache while the data storage system performs the host I/O operations on behalf of the set of host computers.

17. The computer program product of claim 15, wherein determining the priorities of the plurality of cores comprises:
obtaining, from the plurality of queues associated with the plurality of cores, metadata located at heads of the plurality of queues, respectively;
determining, from the metadata, arrival times of a plurality of related data blocks to be processed; and
determining the priorities of the plurality of cores based on the arrival times.

18. The computer program product of claim 15, wherein writing the core identifiers of the plurality of cores into the cache comprises:
storing, by the order of the priorities, the core identifiers of the plurality of cores in the cache in form of an array or a chain table.

19. The computer program product of claim 15, further comprising:
obtaining, from the queue associated with the core that is corresponding to the core identifier, the metadata located at a head of the queue; and
scheduling a data block to be processed that is related to the metadata located at the head for processing.

20. The computer program product of claim 19, further comprising:
determining, in the queue associated with the core that is corresponding to the core identifier, whether there is metadata immediately next to the metadata at the head; and
in response to determining that there is the next metadata, updating priorities of the plurality of cores based on the next metadata.

* * * * *